Patented July 13, 1954

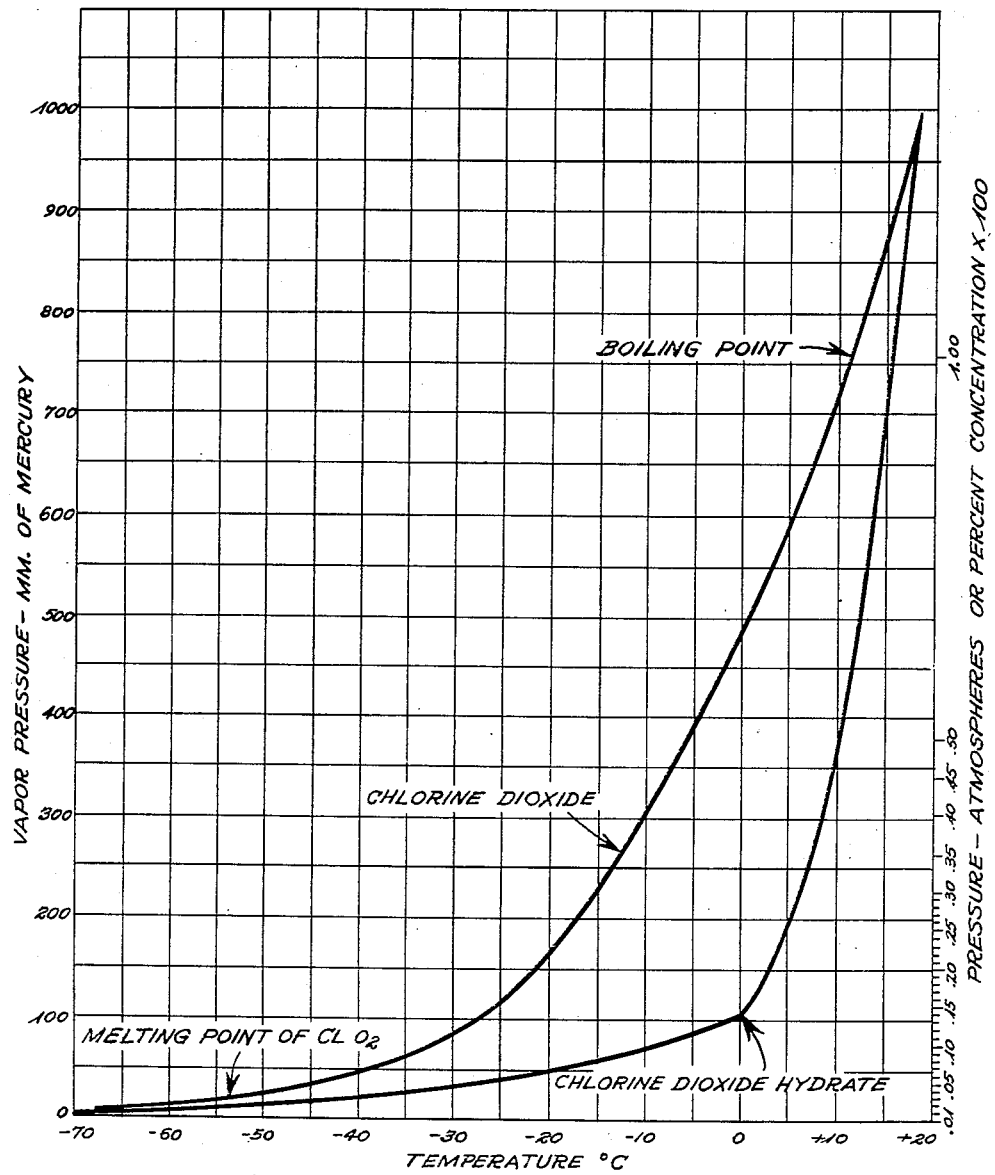

2,683,651

UNITED STATES PATENT OFFICE 2,683,651

NONEXPLOSIVE CHLORINE DIOXIDE HYDRATE COMPOSITION AND PROCESS FOR PRODUCING SAME

Hilding V. Williamson, Chicago, and Clifford A. Hampel, Homewood, Ill., assignors, by direct and mesne assignments, to Cardox Corporation, Chicago, Ill., a corporation of Illinois Application January 17, 1952, Serial No. 266,814

11 Claims. (Cl. 23—152)

This invention relates to a process for manufacturing chlorine dioxide hydrate and to novel compositions thereof.

Chlorine dioxide is a powerful oxidizing agent, which is used for bleaching purposes for textiles, paper, fiber, etc.; for ageing flour and grain; for purifying water and other purposes. It is normally a gas, boiling at about 11° C. and melting at about −59° C. It is poisonous, having effects something like chlorine. It is highly unstable when subjected to sunlight or heat. It is also unstable in concentrated form either as a liquid or a gas. Consequently it has heretofore been handled either in aqueous solution or diluted with an inert gas such as air, nitrogen, carbon dioxide and the like.

The solubility of low partial pressure chlorine dioxide in water is low. At less than 70 mm. partial pressure it is slightly soluble at 0° C. At 2° C. a gas containing 7% chlorine dioxide was bubbled through water yielding a solution containing only 1.4% chlorine dioxide. Mixtures of air and more than about 5% of chlorine dioxide decompose upon sparking at 25° C. and 60° C. and decompose spontaneously at temperatures in excess of about 70° C., the rate and tendency to decomposition increasing as the concentration of chlorine dioxide increases. At concentrations up to 20% the explosions are not violent. Decomposition becomes less vigorous as the temperature is decreased below 25° C. Because of the high partial pressure of chlorine dioxide above a solution of even relatively low concentration the handling and shipping of aqueous solutions of chlorine dioxide would obviously be both unsafe and uneconomical.

Recently the interest in chlorine dioxide as a flour bleaching and ageing reagent has increased tremendously because it has replaced nitrogen trichloride for this purpose in the specifications of the U. S. Food and Drug Administration. The hazards of handling chlorine dioxide both because of its poisonous nature and its instability have posed a real problem in the art.

One solution to the problem is to install small generators at the point of use, the chlorine dioxide evolved being immediately diluted with large amounts of air, which is used to sweep it from the generator and into contact with the flour or other material undergoing treatment. It has heretofore been impractical to produce chlorine dioxide at a central point and ship it to the point of consumption because of the explosive hazards involved. In Germany dilute aqueous solutions were employed but this required the shipping of large quantities of water, since about 97% of the mixture was inert water.

We have discovered that pure chlorine dioxide hydrate is stable and cannot be detonated even by a percussion cap. The hydrate was found to be stable even when a gas mixture above it was exploded. The hydrate exists at temperatures below about 18° C. but exerts a considerable vapor pressure. In the range of temperatures at which the material is stored and transported, the vapor pressure is substantially less.

However, the liquid is dangerous both because of the high vapor pressure of gaseous chlorine dioxide over the liquid and because the liquid itself will detonate in the event of a gas explosion.

The hydrate can be manufactured by mixing liquid chlorine dioxide with water at about 0° C. However, mixing of the liquid with water is attended by hazards. Severe explosions resulting in injury to personnel have been experienced when it was attempted to manufacture the hydrate in this manner. The mixture does not explode on every occasion but its behavior cannot be predicted. It is possible that the reason for this lies in the fact that when the liquid chlorine dioxide is introduced into the water, crystals of hydrate immediately form which tend to surround or include droplets of unconverted liquid chlorine dioxide and, when these are subjected to the proper conditions, the liquid explodes violently. As previously mentioned, the hydrate itself can be handled safely, but mixtures with any substantial quantities of liquid chlorine dioxide are extremely dangerous because of the unstable character of the unhydrated chlorine dioxide.

Merely passing a gas containing chlorine dioxide in low concentrations into water does not necessarily result in the formation of hydrate. With low concentrations of gas the water merely becomes saturated and the hydrate does not form even at 0° C. or slightly below. We have found that at 1° C. the solution must contain at least about 3% chlorine dioxide before the hydrate can be made to precipitate. At lower concentrations cooling the solution merely results in its freezing to ice.

We have discovered that a critical gas concentration and temperature relationship exists which makes possible the formation of the chlorine dioxide hydrate, and that certain steps must be followed in order to produce it at a practical rate and in practical amounts. We have also discovered that the solid hydrate can be formed into shapes convenient for handling, which can be stored or transported safely and economically under practical conditions and in commercial amounts. The most hazardous operation in connection with chlorine dioxide manufacture thus can be carried out at a central point under carefully controlled conditions, and the hydrate can be transported safely and easily to the point of consumption where the gas can be regenerated and diluted with the requisite proportions of air for use in flour bleaching, paper pulp bleaching and the like or the hydrate can be dissolved in water where an aqueous solution is desirable.

The invention will be described in conjunction with the appended drawing of which the figure is a curve of the vapor pressure, and concentration versus temperature.

According to one embodiment the invention comprises passing a gas containing chlorine dioxide into a saturated aqueous solution of chlorine dioxide, at a temperature below about 15° C. and in concentrations such that the partial pressure of the chlorine dioxide in the gas is at least equal to the vapor pressure of the chlorine dioxide in solution over the chlorine dioxide hydrate present, the upper limit of gas concentration being governed by the safety with which the gas can be handled, and further by the upper concentration at which the chlorine dioxide will remain gaseous, i. e., will not condensate, at the operating temperature used, and recovering the chlorine dioxide hydrate formed substantially free of liquid chlorine dioxide.

The minimum concentration of chlorine dioxide in the gaseous mixture will depend upon a number of factors. When the absorption is carried out at atmospheric pressure the minimum concentration will be about 13% of chlorine dioxide vapor in the mixture. When superatmospheric pressure is applied in the absorption step the minimum concentration in the gas is reduced correspondingly. Pressures generally not exceeding 15 pounds per square inch gauge can be employed.

Partial pressures of chlorine dioxide gas in the mixture above 90 mm. and generally above 100 mm. of mercury define the lower limits of operation when absorbing chlorine dioxide in saturated aqueous solutions thereof. With partial pressures lower than this chlorine dioxide hydrate does not form regardless of the length of time the gaseous mixture is passed through the aqueous phase.

The upper limit of chlorine dioxide concentration in the gaseous mixture is generally related to the degree of safety with which the mixture can be handled. The temperature and concentration of chlorine dioxide in the gas mixture affects its explosive characteristics. The lower the temperature the higher the concentrations of chlorine dioxide which can be safely handled. We have successfully and safely used gaseous mixtures containing 13 to 25 and even 30% or more at temperatures from just above the freezing point of the aqueous phase up to about 15° C. Under proper conditions of producing and handling the gaseous mixture, proportions as high as 50% to 65% chlorine dioxide may be used for absorption under atmospheric pressure.

The maximum concentration is about 500 mm. of mercury partial pressure of chlorine dioxide. If higher concentrations are used not only is the tendency to decompose increased but there may be a tendency, at temperatures below the boiling point, for some of the chlorine dioxide to condense from the gaseous mixture. This may result in inclusions of liquid chlorine dioxide in the hydrate, with the undesirable results referred to above. The concentration of chlorine dioxide in the diluent gas expressed in terms of partial pressure should be below that at which condensation of chlorine dioxide from the gas can occur within the operating conditions employed and above about 100 mm. of mercury. Thus, below about 490 mm. partial pressure of chlorine dioxide in the gas no chlorine dioxide can condense at a temperature above about 0° C. It is important to this invention that substantially no liquefaction of chlorine dioxide occur.

Figure 1, appended hereto, sets forth graphically the minimum concentration requirements of the gas at any temperature within the operating range in order for chlorine dioxide hydrate to be precipitated from a saturated aqueous solution of chlorine dioxide.

It is necessary that the aqueous phase be saturated with chlorine dioxide before precipitation of the hydrate can occur. A saturated aqueous phase particularly, one under superatmospheric pressure within the range above set forth, has a freezing point substantially below that of pure water. Thus, by operating under a pressure of about 5 pounds gauge the absorption temperature can be carried down to a minimum of about −8° C. below which the aqueous phase freezes. In general, temperatures of about −1° C. to about 3° C. are preferred and in this range the gas must contain at least 13% chlorine dioxide and preferably 14% to about 25% when operating at atmospheric pressure. Imposition of about 1 atmosphere pressure would permit the use of minimum concentrations as low as about 7.5% since the partial pressure of chlorine dioxide in the gas measured over a saturated solution of chlorine dioxide and solid hydrate would have a minimum partial pressure of about 100 mm.

The use of a small superatmospheric pressure is desirable in view of the fact that it permits a greater amount of absorption of chlorine dioxide from gases containing of the order of 20% to 30%, so that the amount of chlorine dioxide recycled, as above described, is materially reduced.

Chlorine dioxide may be generated by any satisfactory process. One which is particularly beneficial is disclosed in United States Reissue Patent No. 23,111, to Gustav Holst. According to this process, air or other inert diluent gas is mixed with sulfur dioxide and is passed through a fairly concentrated solution of sodium chlorate acidified with sulfuric acid or other mineral acid except halogen acids.

Other known methods include reacting chlorates with mineral acids such as sulfuric or hydrochloric, sometimes in the presence of a reducing agent such as hydrogen peroxide, persulfuric acid, organic acids, formaldehyde, manganese dichloride and other salts of multi-valent metals. It has also been produced by electrolytic reduction of chlorates and reaction of chlorates with hydrogen chloride.

Figure 1 is a curve showing vapor pressures versus temperature of chlorine dioxide and chlorine dioxide hydrate which appears to be the decahydrate. The left hand abscissa shows the vapor pressure in mms. of mercury and the right hand abscissa shows the vapor pressure in atmospheres, which can be converted to percent equilibrium concentration of chlorine dioxide in gas and liquid phases by multiplying by 100. Because of safety precautions necessary in making the determinations the readings on which the curves are based are accurate only to ±4 mm. It will be seen that chlorine dioxide hydrate exerts a substantially lower vapor pressure in the operating ranges contemplated than does chlorine dioxide. Generally speaking pure water is used in the manufacturing steps. Consequently, temperatures below —1° C. are not employed since the water would freeze. However, it is within the contemplation of this invention to add various inert materials to the water, which will depress its freezing point and, therefore, permit the use of temperatures substantially below 0° C. Such materials must be inert to chlorine dioxide and chlorine at the temperatures used for hydrate formation as well as the range of temperatures at which the chlorine dioxide is regenerated from the hydrate. Various types of freezing point depressants may be used. These include electrolytes such as calcium chloride, sodium chloride, magnesium chloride; various mineral acids including sulfuric and phosphoric acids; organic compounds such as aliphatic alcohols including methyl, ethyl and propyl alcohol; polyhydroxy alcohols such as glycerol, ethylene glycol and other glycols. It will be observed from Figure 1 that the partial pressure of chlorine dioxide in the gas phase can be substantially reduced when the temperature is reduced to say —20° C. At this temperature a partial pressure equal to 50 mms. or a concentration of about 7% can be used in formation of the hydrate. This is an advantage from a safety standpoint. When pure water is used above 0° C. and atmospheric pressure, a partial pressure above 100 mms. or a concentration of about 12–13% minimum is required.

As previously mentioned, if superatmospheric pressure is used in the absorption step the minimum chlorine dioxide partial pressure of 100 mm. would be expressive of a percentage concentration somewhat less than the minimum above stated for atmospheric pressure.

If contact between the gas and aqueous phase is efficient, the hydrate forms rapidly as pale yellow crystals. To initiate and facilitate crystallization the solution may be seeded with previously formed hydrate crystals. The use of concentrations of chlorine dioxide greater than the minimum is desirable in view of the fact that a larger proportion of hydrate will form for a given quantity of feed gas, which in turn reduces the amount of recirculation.

The reaction to form the hydrate is generally so rapid that the concentration of the effluent gas will be of about the equilibrium concentration. Therefore, the effluent gas will contain a substantial proportion of chlorine dioxide. Rather than install a recovery system or a concentrating system for this gas, it is recycled to the generator as a sweep gas especially when a process such as that described by Holst is used. It is thus enriched by chlorine dioxide from the generator and returned to the absorber.

As hydrate formation occurs the crystals separate from the aqueous phase, the material in the absorption zone may eventually become a thick mush. If the absorption is carried out to this point the entire mixture of water and crystals can be withdrawn from the absorber and frozen into cakes, spheres, cubes or other shapes, or can be frozen into a block and granulated if desired.

The crystals after separating the excess water can be treated with gas containing chlorine dioxide of the above defined concentrations and temperature conditions so that occluded water can be converted to the hydrate. This may be done by passing the gas through the filter cake before pressing.

As previously pointed out, the solid hydrate has an appreciable vapor pressure and must be stored at low temperatures. Temperatures below zero are employed and preferably in the neighborhood of —20° C.

In order to reduce the tendency of chlorine dioxide to sublime from the blocks, we have adopted a novel and effective scheme of coating the exterior of the blocks or other shapes, with water ice. This can be done by cooling the blocks below the freezing point of water and then dipping them into cold water or by spraying water over the exterior. Since the blocks are at a temperature below the freezing point of water, a thin layer of ice is immediately formed and this prevents the chlorine dioxide from escaping from the hydrate. As a consequence, the blocks can be stored for long periods of time without appreciable escape of chlorine dioxide, which reduces hazards and greatly simplifies storage and transportation problems. This ice coating method can be resorted to for protecting other shapes such as spheres, cubes or even granules. There is a tendency for chlorine dioxide to eventually diffuse through the ice, but since the vapor pressure at commercial storage temperatures is low, the diffusion rate is slow. There is a tendency for the chlorine dioxide to combine with the ice layer during the diffusion. These shapes particularly when coated with ice constitute new and highly useful compositions of matter.

The shaped hydrate is stored and transported in refrigerated containers much like those used for the transportation and storage of solid carbon dioxide. These resemble the well-known domestic deep freeze units. However, they should be equipped with means by which the box can be ventilated in order to sweep out accumulated chlorine dioxide gas especially before loading and unloading so as not to expose the operator to the fumes, and to avoid hazards from decomposition of accumulated gas. The containers should be equipped with explosion relief lids. At the low temperatures the material can be stored and handled without hazard. Thus even though accidentally subjected to a spark or the like which at room temperature or above would cause decomposition of chlorine dioxide gas, the hazard is nil below 0° C. However, in case of failure of the refrigeration equipment, the partial pressure of chlorine dioxide may build up and conditions could conceivably arise in which an unstable concentration of gas existed. By use of suitable relief means even if decomposition occurred pressures developed would dissipate without damage to the box. As previously stated, the hydrate in the absence of liquid chlorine dioxide is stable and has resisted all attempts to detonate it even when subjected to the firing of a percussion cap.

The following examples are given to illustrate the process but should not be considered as unduly limiting it.

*Example I*

Chlorine dioxide hydrate was made by cooling water to 0° C. and bubbling through the water a gas mixture containing air and 13% chlorine dioxide gas. After the gas had been passed through until 2.9% of chlorine dioxide was dissolved, crystallization was initiated by adding several small pieces of solid carbon dioxide to the water. A mush of yellow hydrate crystals formed which contained 17% of chlorine dioxide. The crystals were filtered and could be pressed into a solid cake.

Example II

A similar run was made to that of Example I using a gas containing 16% chlorine dioxide. The amount of chlorine dioxide dissolved in the water was about 3%. The crystals which formed contained 23.4% chlorine dioxide.

Example III

Chlorine dioxide hydrate was made under conditions similar to those described in Example I with the water temperature at 1° C. and with a gas of 26.6% chlorine dioxide content. The water contained about 3% chlorine dioxide.

Example IV

Chlorine dioxide hydrate was made with a 16.1% chlorine dioxide containing gas and the water at 1° C. The water contained 2.9% chlorine dioxide and had a specific gravity of 1.03. The hydrate crystals contained 24.9% chlorine dioxide.

Example V

Chlorine dioxide hydrate was made under the conditions of Example I using gas containing 18.2% chlorine dioxide. The aqueous phase contained 3.5% chlorine dioxide. The yellow crystals of hydrate contained 20.3% chlorine dioxide.

The analysis on the hydrate of the above examples varies because of the presence of free water. The true water of hydration is nearer the decahydrate.

The chlorine dioxide used contained less than 1.5% and in general about 0.5% chlorine.

Example VI

A mixture of chlorine dioxide and air was cooled to 0° C. and was passed through water-containing absorbers and held at various temperatures from 0° C. to 5° C. Concentrations of gas ranging from 14 to 23% chlorine dioxide were used. Crystallization was initiated by adding solid carbon dioxide to the saturated solutions which promoted immediate precipitation of the hydrate. Hydrates containing an indicated 10 to 13 molecules of water of crystallization were formed. In these runs the excess water was filtered from the crystals and a gas containing 16.5 to 17.9% of chlorine dioxide mixed with air was passed through the mass of crystals. In this way, a hydrate having indicated water of crystallization of more than 13 molecules was converted to a hydrate having 10 molecules of water of crystallization. The time used for this gas treatment ranged from about 10 to about 50 minutes. The decahydrate was formed after about 10 minutes treatment with the gas containing 17.9% chlorine dioxide and after about 20 minutes when the gas contained about 16.5% chlorine dioxide. The crystals were held just above the freezing point of water during the gas treatment.

These compositions were formed into blocks by pressing. After cooling the blocks to about −20° C. they were dipped briefly in water at a temperature of about 1° C. whereupon a thin coating of ice formed. Blocks made in this way could be stored for long periods of time with evolution of little or no chlorine dioxide. In general, a coating of ice from about $\frac{1}{16}$ to about $\frac{1}{4}$ inch may be used. Thicker coatings have been found generally unnecessary. A coating in the neighborhood of ⅛ inch is preferred.

This application is a continuation in part of our copending application, Serial No. 100,484, filed June 21, 1949, now abandoned.

We claim as our invention:

1. A process for forming non-explosive chlorine dioxide hydrate free of liquid chlorine dioxide which comprises the steps of absorbing chlorine dioxide vapor from a gaseous mixture consisting essentially of chlorine dioxide vapor and inert diluent gas, in a saturated aqueous solution of chlorine dioxide maintained at a temperature below about 15° C. and above the freezing point of the aqueous phase, the partial pressure of said chlorine dioxide in the gas mixture being at least equal to the vapor pressure of the chlorine dioxide in the aqueous phase measured over chlorine dioxide hydrate and, in any event, being at least about 100 mm. and below 500 mm. of mercury, and recovering the chlorine dioxide hydrate product formed and forming it into a solid coherent body containing up to about 24.9% by weight of chlorine dioxide.

2. The process of claim 1 wherein the recovered chlorine dioxide hydrate is formed into a solid shaped body by applied mechanical pressure.

3. The process of claim 1 wherein the hydrate is recovered as a slurry of crystals in water and the resultant mass is frozen.

4. The process of claim 1 wherein the recovered hydrate is first compressed into a solid shaped body, then cooled below the freezing point of water and coated with a layer of ice.

5. The process of claim 1 wherein the aqueous solution contains a freezing point depressant.

6. The process of claim 1 wherein the aqueous solution contains a freezing point depressant comprising sulfuric acid.

7. The process of claim 1 wherein the body is coated with water ice.

8. A process for forming non-explosive chlorine dioxide hydrate substantially free of liquid chlorine dioxide, comprising the steps of generating chlorine dioxide gas, diluting it with an inert gas to form a gaseous mixture in which the partial pressure of said chlorine dioxide is at least 100 mm. and below 500 mm. of mercury, absorbing chlorine dioxide gas from said mixture in a saturated aqueous solution of chlorine dioxide at a temperature below about 15° C. and above the temperature at which the aqueous phase freezes, to form chlorine dioxide hydrate, separating the gaseous mixture containing a reduced chlorine dioxide content from the absorption step, recycling it to said generation step as a source of said inert gas therein, increasing the chlorine dioxide content to a partial pressure above 100 mm. and below 500 mm. of mercury, and recovering the chlorine dioxide hydrate product from the absorption step containing up to about 24.9% by weight of chlorine dioxide.

9. The process of claim 8 wherein the hydrate is recovered from the absorption step as a slurry of crystals, removing the aqueous phase from said slurry, and recycling it to the absorption step.

10. A process for forming non-explosive chlorine dioxide hydrate substantially free of liquid chlorine dioxide which comprises absorbing chlorine dioxide vapors from a gaseous mixture consisting essentially of chlorine dioxide vapor and an inert diluent gas, in a saturated aqueous solution of chlorine dioxide maintained at a temperature below about 7° C. and above the freezing point of the aqueous phase, the partial pressure of said chlorine dioxide in the gas mixture being at least about 100 mm. and below 500 mm. of mercury, recovering the chlorine dioxide hydrate crystals formed, and passing a mixture of chlorine dioxide gas and an inert diluent gas over said crystals at a temperature of about −1° C. to about 7° C., the partial pressure of the chlorine dioxide in said last mentioned gas being at least about 100 mm. and below 500 mm. of mercury, thereby forming additional chlorine dioxide hydrate from the aqueous phase occluded to said hydrate crystals.

11. A process for forming non-explosive chlorine dioxide hydrate free of liquid chlorine dioxide, which comprises the steps of absorbing, at a super-atmospheric pressure, chlorine dioxide vapor from a gaseous mixture consisting essentially of chlorine dioxide vapor and inert diluent gas in a saturated aqueous solution of chlorine dioxide maintained at a temperature below about 15° C. and above the freezing point of the aqueous phase, the partial pressure of said chlorine dioxide in the gas mixture being at least equal to the vapor pressure of the chlorine dioxide in the aqueous phase measured over chlorine dioxide hydrate and, in any event, being at least about 100 mm. of mercury and below about 500 mm. of mercury, recovering the chlorine dioxide hydrate product formed, and forming it into a solid coherent body.

References Cited in the file of this patent

UNITED STATES PATENTS

| Number | Name | Date |
|---|---|---|
| Re. 23,111 | Holst | May 10, 1949 |
| 2,335,808 | Soule | Nov. 30, 1943 |
| 2,489,572 | Hampel | Nov. 29, 1949 |

OTHER REFERENCES

J. W. Mellor's "A Comprehensive Treatise on Inorganic and Theoretical Chemistry," vol. 2, 1922 ed., pp. 289, 290; Longmans, Green and Co., New York.

Ephraim's "Inorganic Chem.," 4th ed., revised, page 377; Nordeman Publishing Co., Inc., New York.